INVENTOR:
JOHN A. HINKEBEIN

United States Patent Office 3,436,184
Patented Apr. 1, 1969

3,436,184
PROCESS FOR RECOVERING PHOSPHORUS
FROM SLUDGE
John A. Hinkebein, Manchester, Mo., assignor to
Monsanto Company, St. Louis, Mo., a corporation
of Delaware
Filed Aug. 25, 1964, Ser. No. 391,895
Int. Cl. C01b 25/02
U.S. Cl. 23—223                               7 Claims

ABSTRACT OF THE DISCLOSURE

The phosphorus content of sludge is reduced by admixing a water-soluble inorganic hexavalent oxy-chromium compound with the sludge to improve the separation of phosphorus contained in the sludge.

---

This invention relates to processes for the production and recovery of phosphorus and is directly concerned with decreasing the phosphorus content of sludge obtained as a by-product in phosphorus production and, more particularly, relates to processes for treating sludge to recover the phosphorus therefrom.

In the production of elemental phosphorus by the thermal reduction of phosphatic materials with a reducing agent, such as coke or other carbonaceous reducing agents, in the presence of a flux such as silica, the phosphorus-containing gases given off in the furnaces contain solid impurities such as particles of slag and unfused constituents of the charging materials which cause the formation of sludge when the phosphorus vapor is condensed to the liquid form. This sludge contains varying but appreciable amounts of phosphorus which oftentimes renders problems in the disposal thereof as well as lowering the over-all yield of phosphorus produced.

The sludge, as the term is used in the art and herein, is a somewhat poorly defined emulsion or dispersion containing solid impurities, water and phosphorus in widely varying proportions with usually a density between the density of phosphorus and the density of water. The type of emulsion can vary from being primarily a phosphorus in water type emulsion, that is, the phosphorus being the discontinuous phase and the water being the continuous phase, to a water in phosphorus type emulsion, that is, the water being the discontinuous phase and the phosphorus being the continuous phase. In general, the discontinuous phase is usually in the form of globular particles having fine particulate impurities associated therewith, with the size of the particles being generally in the range of from millimeter dimensions to micron dimensions.

Heretofore, methods for decreasing the phosphorus content of the sludge have been physical methods for separating the phosphorus from the sludge with such methods as filtration, distillation, centrifuging, briquetting and the like being employed. However, such methods leave much to be desired because of, among other things, such limitations as the expense of the methods, the type of equipment necessary and the maintenance required thereon, and the quality of the phosphorus recovered. As can be appreciated, therefore, a method which uses a chemical treatment for decreasing the phosphorus content of the sludge and thereby minimizes or obviates the limitations of the foregoing methods would represent an advancement in this art.

It is, therefore, an object of this invention to provide an improved process for the production and recovery of phosphorus.

It is another object of this invention to provide an improved process for decreasing the phosphorus content of sludge obtained as a by-product in phosphorus production.

It is another object of this invention to provide an improved process which uses a chemical treatment for decreasing the phosphorus content of sludge obtained as a by-product in phosphorus production.

It is a still further object of this invention to provide an improved process which uses a chemical treatment for reducing the phosphorus content of the sludge and thereby minimizes or obviates the limitations of the physical methods used heretofore.

It is a still further object to provide an improved process for the recovery of phosphorus from sludge obtained as a by-product in phosphorus production.

These, as well as other objects of this invention, are accomplished by a process which comprises treating the sludge with an oxidizing agent in order to decrease the phosphorus content of the sludge, all of which will be more fully described hereinafter. The treatment can be applied either during the formation of the sludge or after formation and for purposes herein the term "treating the sludge" is intended to cover the treatment thereof either during or after its formation. As can be appreciated, such a process is extremely versatile in that it can be used at various stages within the process for the production of phosphorus. In addition, the process is simple, economical and permits the recovery of a relatively high quality phosphorus. The use of an oxidizing agent in this manner is believed to be unexpected due to the ease with which phosphorus can be oxidized. In theory at least, the discontinuous phase is coated with such materials as oxide films, particulate impurities and the like which prevents the union or coalescence thereof and the effectiveness of the oxidizing agent is believed to be attributable to its action in attacking the coating of the discontinuous phase and/or inhibiting the formation of the coating on the discontinuous phase with the result being an improved separation of the phosphorus and the sludge and the reduction of the phosphorus content of the sludge.

In general, any oxidizing agent can be used and, in particular, oxidizing agents whch function in acidic solutions, especially strong oxidizing agents including organic as well as inorganic oxidizing agents. As examples, the followng are included: hydrogen peroxide and its addition compounds, including the hydroperoxides and peroxide compounds, such as the peroxide of sodium and the superoxide of potassium, urea percompounds, perborates, and the peracids such as persulfuric acid, per acetic acid, peroxy monophosphoric acid and their water-soluble salt compounds such as sodium, potassium, ammonium and organic amine salts. Also included are such inorganic oxidizing agents as the halogens (fluorine, chlorine, bromine, and iodine) and especially chlorine as $Cl_2$ or nascent chlorine Cl, the acid and water-soluble salts containing oxygenated anions, such as $NO_3^-$, $SeO_4^-$, $MnO_4^-$, and especially the ovygenated halide anions, such as, $ClO_3^-$, $IO_3^-$, $ClO_4$, $BrO_3^-$, $ClO^-$, and the like, and particularly the alkali metal salts, such as sodium, potassium, lithium and the like, and the ammonium salts thereof. The salts of the oxygenated anions can be activated, if desired, by use of a strong inorganic acid, such as a hydrohalide acid (hydrochloric acid) and the like. Water-soluble hexapositive chromium compounds are preferred because of the better yields and quality of phosphorus recovered from the sludge when such are used and include chromic acid, the alkali metal chromates and dichromates such as sodium, potassium, lithium chromates and dichromates and the like, the alkaline earth metal chromates and dichromates, such as magnesium, calcium, strontium and barium chromates and dichromates and the like, including mixtures of the foregoing. When using the chromates and dichromates, it is preferred that such be used with a strong inorganic acid, particularly sulfuric acid, and preferably on about a mole per mole basis.

The oxidizing agents of the present invention can be uced in the treatment of, in general, any sludge. As previously mentioned, the sludge can be treated either during the formation thereof or after the sludge has been formed. In general the sludge is formed when the phosphorus component of the phosphorus-containing gases is condensed to the liquid form. The phosphorus-containing gases can vary in composition, however, usually such gases contain, in addition to phosphorus gas, a major amount, i.e., over about 50% by volume, of carbon monoxide and a minor amount of such materials as particulate impurities, methane, hydrogen, silicon tetrafluoride and the like. It is not uncommon for the phosphorus-containing gases to contain from about 1% to 15% by volume of phosphorus and as much as 75% to 90% by volume of carbon monoxide. Treating the sludge during its formation can be accomplished by condensing the phosphorus with an aqueous medium containing the oxidizing agent, the temperature of which is below the dew point of the phosphorus. The pH of the aqueous medium used in condensing the phosphorus can vary but usually has a pH below about 7.5 and preferably from about 1 to 5.5 and can contain, in addition to the oxidizing agent, ammonia, alkali metal and ammonium hydroxides and carbonates, and other inorganic salts, particularly buffering salts. The temperature of the aqueous medium containing the oxidizing agent should be below the condensation temperature of the phosphorus vapor, and, although such varies with the composition of the phosphorus-containing gases, is preferably from about 40° C. to about 75° C. The concentration of the oxidizing agent in the aqueous medium can vary considerably and, in general, any concentration can be used which reduces the phosphorus content of the sludge without oxidizing substantial amounts of phosphorus to higher oxidation states. Especially useful are concentrations in the aqueous medium having an oxidizing ability equivalent to that obtained from the presence therein of from about 0.10% to 5.0% by weight of chromic acid. Such concentrations are, in general, preferably dilute, i.e., below about 20% by weight, and especiallyly preferred are concentrations from about 0.01% to 10% by weight. Although, in general, the phosphorus-containing gases need only be contacted with the aqueous condensing medium containing the oxidizing agent it is preferred that such be carried out under conditions which establish intimate contact of the gases with the aqueous medium such as by spraying the gases with a spray of the aqueous medium and the like. It should also be noted, that in some instances it may be advantageous to separately add the oxidizing agent during or after the contacting of the phosphorus-containing gases with the aqueous condensing medium. After treatment, the recovery of the phosphorus can be carried out by collecting the liquid phosphorus containing materials, which include phosphorus, sludge and the aqueous condensing medium containing the oxidizing agent, allowing the phosphorus to settle out and collecting the phosphorus.

Another method for treating the sludge is by contacting the sludge with an oxidizing agent after it has been formed. As previously mentioned, the sludge is, in general, a poorly defined emulsion or dispersion containing solid impurities, water and phosphorus and the content of the sludge can vary considerably in the amount of each material which is present. Therefore, no general sludge analysis can be given which covers all sludge compositions, although, usually a typical sludge which is a phosphorus in water type emulsion contains from about 1% to about 25% solids by weight, about 15 to 85% phosphorus by weight and the balance being water which is present at least above 5% by weight. Additionally, a typical sludge which is a water in phosphorus type emulsion contains from about 1% to about 40% solids by weight, about 35% to about 98% phosphorus by weight and the balance being water which is present at least above 1% by weight. The pH of the sludge can vary but is usually below about 7.5 and more commonly from about 5 to 7.5. The sludge need only be contacted with the oxidizing agent, however, it is preferred that such be carried out under conditions which establish intimate contact of the discontinuous phase of the sludge and the oxidizing agent such as by stirring, vigorous agitation and the like. In cases where the sludge contains appreciable amounts of water, the oxidizing agent can be directly added thereto, however, it may at times be advantageous to first dissolve the oxidizing agent in an aqueous solution and contact the sludge therewith. In any event, it is usually desirable to contact the sludge with the oxidizing agent in the presence of an aqueous medium. The concentration of the oxidizing agent in the aqueous medium can vary considerably and, in general, any concentration can be used which reduces the phosphorus content of the sludge without oxidizing substantial amounts of phosphorus to higher oxidation states. Especially useful are concentrations in the aqueous medium having an oxidizing ability equivalent to that obtained from the presence therein of from about 0.10% to 10.0% by weight of chromic acid. Such concentrations are, in general, preferably dilute, i.e., below about 20% by weight of the aqueous medium, and especially preferred are concentrations from about 0.01% to 10% by weight of the aqueous medium. After treatment the recovery of the phosphorus can be carried out by allowing the phosphorus to settle out of the sludge and collecting the phosphorus.

In order to facilitate the description and understanding of this invention, reference is made to the appended drawings in which.

Figure 1:
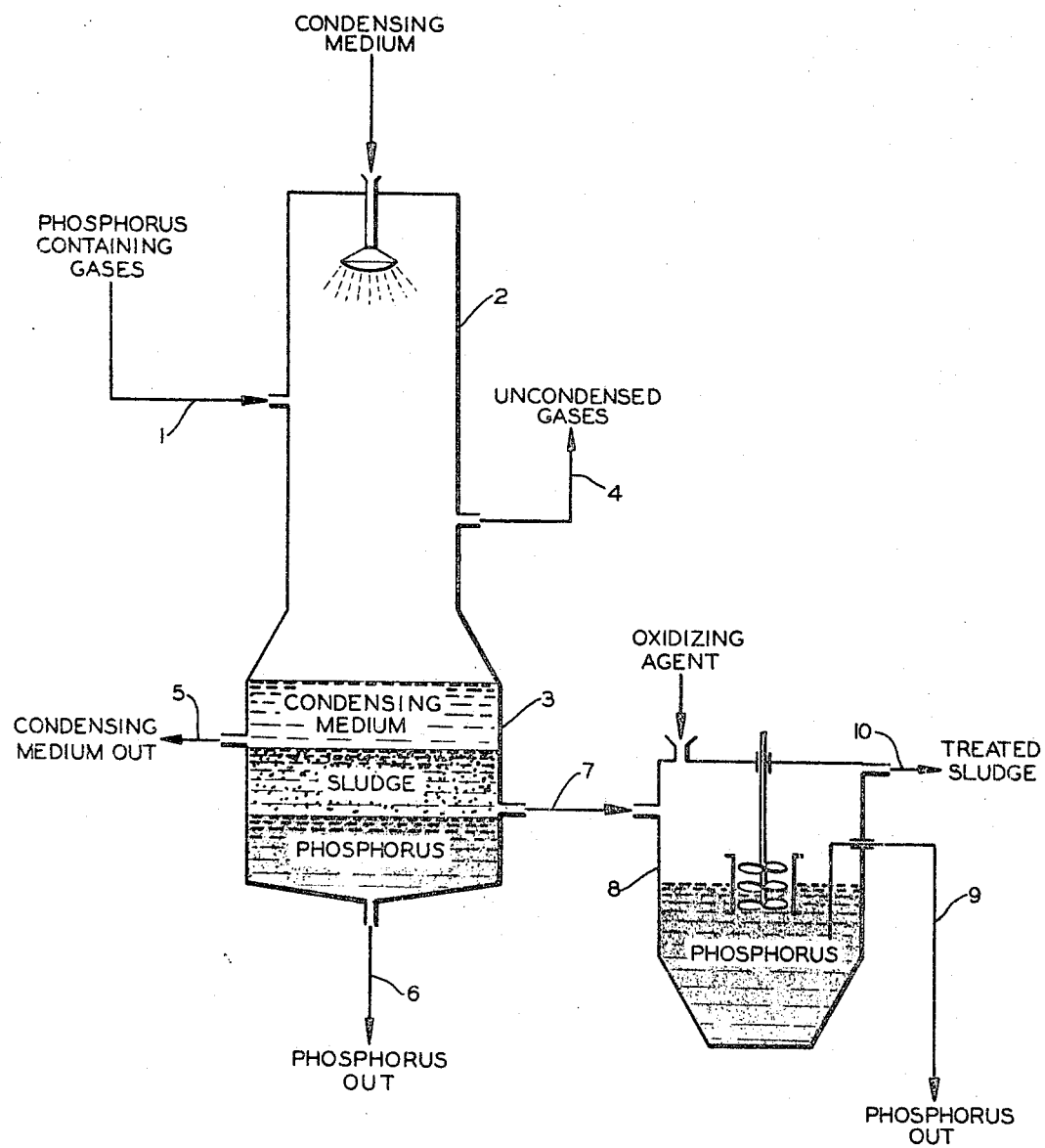
FIGURE 1 is a schematic flow sheet showing one embodiment of the instant invention for the recovery of phosphorus from sludge.

Referring now to FIGURE 1 which illustrates one embodiment of the present invention. Phosphorus-containing gases produced, for example, in an electric furnace and, if desired, passed through process stages, such as electrostatic precipitators which remove from the gases to various degrees some of the particulate impurities, are directed by line 1 to the condenser 2 where the gases are contacted with a condensing medium, usually water and containing, if desired, such materials as dissolved ammonia, sodium hydroxide, sodium carbonate and the like. The phosphorus-containing gases are sprayed at a temperature below the dew point of phosphorus with the condensing medium. This results in the production of a liquid dispersion which includes phosphorus, condensing medium and sludge. The dispersion thus obtained is passed to a sump 3 and allowed to stratify into three rather distinct phases i.e., phosphorus, sludge and condensing medium, although the boundaries between such phases are not necessarily distinct. The uncondensed gases are discharged by line 4 from the system and are usually conveyed to various points in the plant to be used as fuel. The condensing medium is passed by line 5 either for recycling back to the condenser or for disposal. The phosphorus is recovered from the sump by passing through line 6 to, for example, storage tanks maintained at a temperature high enough to keep the element in liquid form. The sludge phase which is most generally a phosphorus in water type emulsion or dispersion is passed through line 7 to a sludge mixer tank 8. In this tank the sludge is mixed with the oxidizing agent in the presence of a sufficient amount of aqueous medium in order to effect a separation of the phosphorus therefrom. As shown the mixer tank is operated continuously with the phosphorus separated from the sludge being removed therefrom by a gravity outlet 9 to, for example, a storage tank maintained at an elevated temperature sufficient to keep the phosphorus in the liquid form. The treated sludge is removed from the mixer tank by overflow and passed by line 10 for disposal.

This embodiment of the present invention will now be further illustrated by the following examples in which all parts and percentages are by weight unless otherwise specified.

EXAMPLE 1

A sludge phase (phosphorus in water type emulsion) from the sump obtained as hereinbefore described, having a density of 1.25 and the following composition:

| Composition: | Percent by weight |
|---|---|
| $P_4$ | 34 |
| Solids | 13 |
| Water | 53 | was continuously charged at a rate of about 45 gal./hr. to a mixing tank under stirring with a blade speed of about 105 r.p.m. A 1% chromic acid solution was continuously charged to the mix tank at about 90 gal./hr. The treated sludge was recovered as overflow from the tank and the phosphorus was continuously withdrawn from an outlet in the bottom of the tank. Samples of each taken at intervals of about 6 hours gave the following results:

TABLE 1

| Sample | Treated sludge analysis | | | $P_4$ analysis | | $CrO_3$ usage, lbs. $CrO_3$/100 lbs. $P_4$ |
|---|---|---|---|---|---|---|
| | Percent P | Percent Solids | Percent $H_2O$ | Percent $CrO_3$ | Percent B.I.[1] | |
| 1 | 7.05 | 5.73 | 87.22 | 0.30 | 0.028 | 3.00 |
| 2 | 4.66 | 5.61 | 89.73 | 0.29 | 0.005 | 3.07 |

[1] Percent B.I. (benzene insoluble.

Materials obtained by extracting with benzene phosphorus from the benzene insoluble residue contained therein and expressed as percent by weight of phosphorus.

EXAMPLE 2

Another sludge phase (phosphorus in water type emulsion) from the sump obtained as hereinbefore described having a density of 1.42 and the following composition:

| Composition: | Percent by weight |
|---|---|
| $P_4$ | 60 |
| Solids | 9 |
| Water | 31 | was continuously charged at a rate of about 45 gal./hr. to a mixing tank under stirring with a blade speed of about 125 r.p.m. A 2.4% chromic acid solution was continuously charged to the mix tank at about 42 gal./hr. The treated sludge was recovered as overflow from the tank and the phosphorus was continuously withdrawn from an outlet in the bottom of the tank. Samples of each taken at intervals of about 6 hours gave the following results:

TABLE 2

| Sample No. | Treated sludge analysis | | | $P_4$ analysis | | $CrO_3$ usage, lbs. $CrO_3$/100 lbs. $P_4$ |
|---|---|---|---|---|---|---|
| | Percent $P_4$ | Percent solids | Percent water | Percent $CrO_3$ | Percent B.I. | |
| 1 | 0.28 | 9.37 | 90.35 | 0.51 | 0.045 | 1.80 |
| 2 | 0.03 | 8.08 | 91.89 | 0.58 | 0.037 | 1.54 |

The above data dramatically illustrates the ability of the present invention to reduce the phosphorus content of the various "typical" sludges and, as can be observed therefrom, a considerable reduction of phosphorus retained in the sludges is effected by the use of minor amounts of the oxidizing agent, chromic acid, as well as the recovery of a relatively high quality phosphorus.

Results somewhat comparable to the foregoing examples can also be obtained under substantially similar conditions using other oxidizing agents which include hydrogen peroxide, nitric acid and alkali metal chlorates such as sodium chlorate, and good results comparable to the foregoing examples can be obtained with other water-soluble hexapositive chromium compounds such as the alkali metal and alkaline earth metal chromates and dichromates especially when such chromates and dichromates are used with sulfuric acid.

Figure 2:
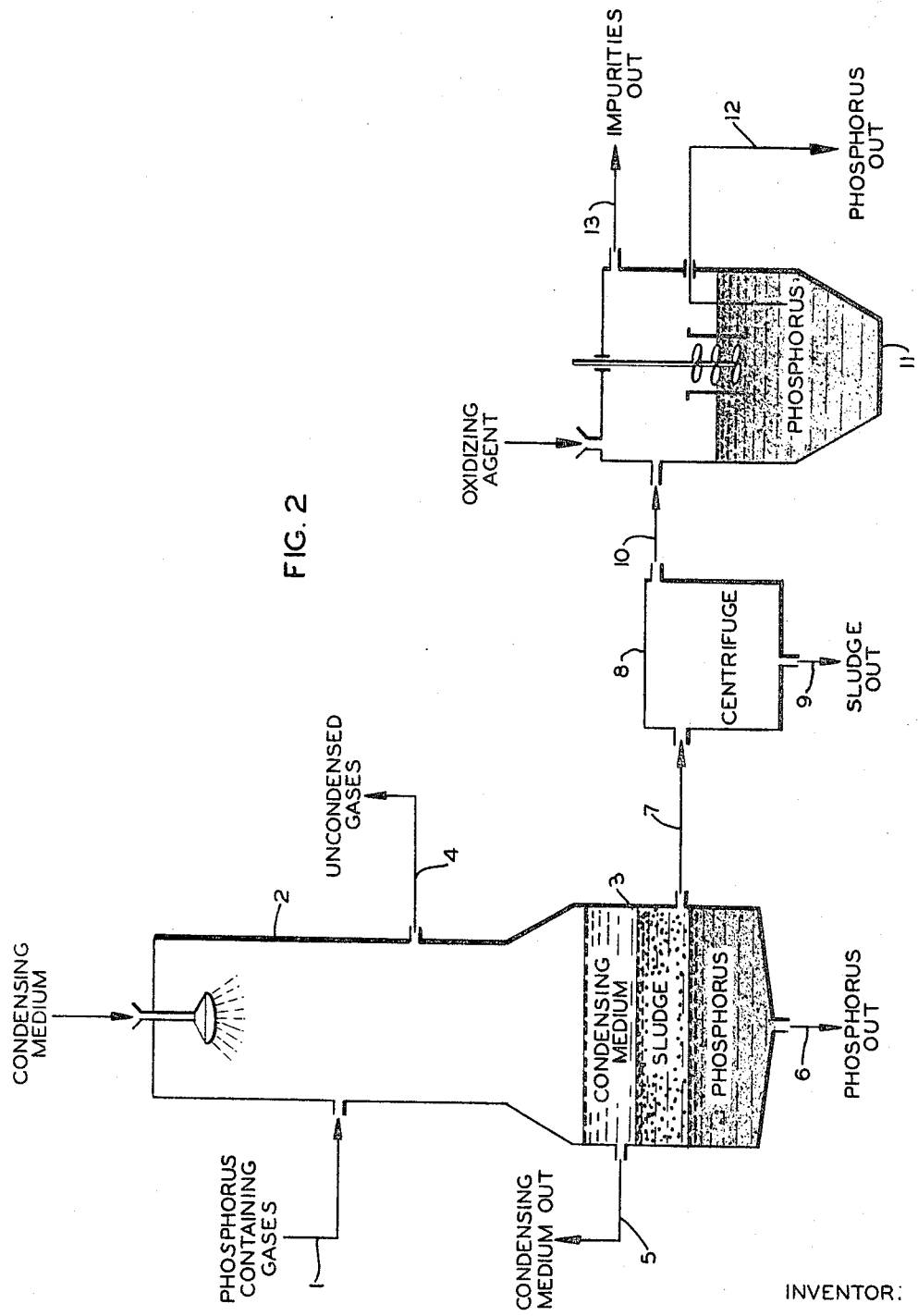
FIGURE 2 is a schematic flow sheet showing another embodiment of the instant invention for the recovery of phosphorus from sludge.

Referring now to FIGURE 2 which illustrates another embodiment of the present invention. Phosphorus-containing gases produced, for example, in an electric furnace and, if desired, passed through electric precipitators which remove from the gases to various degrees some of the particulated impurities, are directed by line 1 to the condenser 2 when the gases are contacted with a condensing medium, usually water and containing, if desired, such materials as dissolved ammonia, sodium hydroxide, sodium carbonate and the like. The phosphorus-containing gases are sprayed at a temperature below the dew point of phosphorus with the condensing medium. This results in the production of a liquid dispersion which includes phosphorus, condensing medium and sludge. The dispersion thus obtained is passed to a sump 3 and allowed to stratify into three rather distinct phases, i.e., phosphorus, sludge and condensing medium, although the boundaries between such phases are not necessarily distinct. The uncondensed gases are discharged by line 4 from the system and are usually conveyed to various points in the plant to be used as fuel. The condensing medium is passed by line 5 either for recycling back to the condenser or for disposal. The phosphorus is recovered from the sump by passing through line 6 to, for example, storage tanks maintained at a temperature high enough to keep the element in the liquid form. The sludges phase which is most generally a phosphorus in water type emulsion or dispersion is passed through line 7 to a centrifuge 8. Some of the phosphorus is removed from the sludge in the centrifuge and phosphorus-reduced sludge is passed therefrom through line 9 for disposal. In some cases it may be necessary to add water to the centrifuge in order to obtain better separation of the phosphorus from the sludge. The phosphorus from the centrifuge contains sludge, that is, water and particulate impurities, and is most generally a water in phosphorus type emulsion. This material is passed through line 10 to a mixer tank 11. In this tank the phosphorus (containing sludge impurities) is mixed with the oxidizing agent in the presence of a sufficient amount of aqueous medium in order to effect a separation of the phosphorus from the sludge impurities contained therein. As shown the mixer tank is operated continuously with the phosphorus separated from the sludge impurities being removed therefrom by a gravity outlet 12 to a storage tank maintained at an elevated temperature sufficient to keep the phosphorus in liquid form. The sludge impurities are removed from the mixer tank by overflow and passed by line 13 for disposal.

An alternate method to the foregoing, which in some cases may prove advantageous, is to pass the phosphorus containing sludge impurities to a settling tank, allowing a portion of the phosphorus to separate from the sludge impurities by settling out, removing the remaining phosphorus containing sludge impurities which is most generally a water in phosphorus type emulsion and treating this emulsion with an oxidizing agent in a mixer tank as hereinbefore described.

Figure 3:
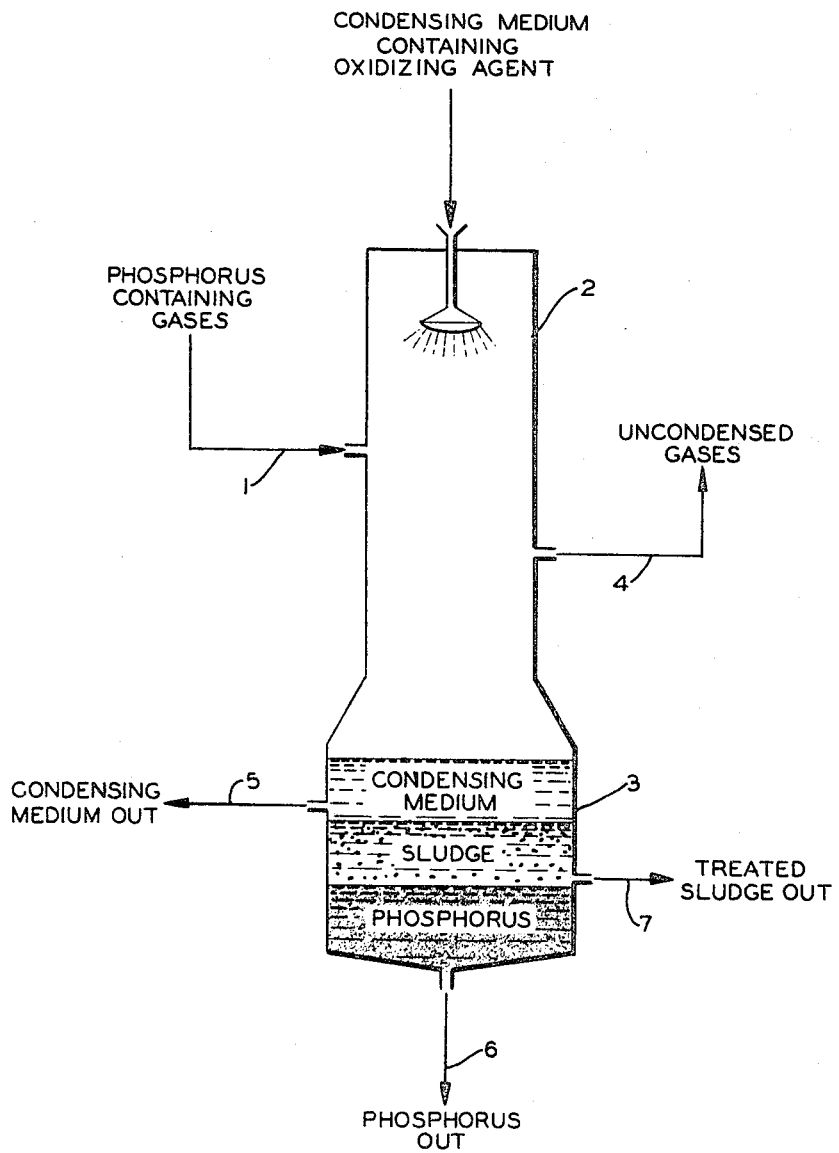
FIGURE 3 is a schematic flow sheet showing still another embodiment of the instant invention for the recovery of phosphorus from sludge.

Referring now to FIGURE 3 which illustrates another embodiment of the present invention. Phosphorus-containing gases produced, for example, in an electric furnace and, if desired passed through electric precipitators which remove from the gases to various degrees some of the particulated impurities, are directed by line 1 to the condenser 2 where the gases are contacted with a condensing medium made up of water and an oxidizing agent and containing, if desired, other additives, such as, dissolved ammonia, sodium hydroxide, sodium carbonate, and the like. The phosphorus-containing gases are sprayed at a temperature below the dew point of phosphorus with the condensing medium. This results in the production of a liquid dispersion which includes phosphorus, condensing medium and sludge. The dispersion thus obtained is passed to a sump 3 and allowed to stratify into three rather distinct phases, i.e., phosphorus, sludge and condensing medium, although the boundaries between such phases are not necessarily distinct. The uncondensed gases are discharged by line 4 from the system and are usually conveyed to various points in the plant to be used as fuel. The condensing medium is passed by line 5 either for recycling back to the condenser or for disposal. The phosphorus is removed from the sump by passing through line 6 to, for example, storage tanks maintained at a temperature high enough to keep the element in the liquid form. The treated sludge is removed from the sump through line 7 for disposal. In the foregoing embodiment, the use of an oxidizing agent in the condenser medium results in a reduction of phosphorus retained in the sludge.

It can, of course, be appreciated that various combinations of the foregoing as well as other embodiments may prove advantageous in certain instances, as, for example, the use of an aqueous solution of the oxidizing agent as the condensing medium in condensing the phosphorus in the phosphorus-containing gases to the liquid form as well as treating the sludge obtained therefrom with a solution of an oxidizing agent to reduce the phosphorus content of the sludge.

The process of the present invention has many advantages over the conventional physical methods for recovering phosphorus from the sludge which includes an easy, economical and simple method which does not require elaborate processing equipment along with the necessary care and maintenance thereof as well as permitting in some instances process equipment to be eliminated such as, for example, the elimination of the electrostatic precipitators used in purifying the phosphorus-containing gases. Additionally, the process is quite versatile in that it can be adapted for use at various stages in the process. Still further, the process permits the recovery of a relatively high quality phosphorus.

What is claimed is:

1. A process for reducing the phosphorus content of a sludge which comprises incorporating a water-soluble inorganic hexavalent oxy-chromium compound into said sludge and intimately contacting the discontinuous phase of said sludge with said compound to improve the separation of the phosphorus contained in said sludge.

2. A process according to claim 1 wherein said compound is chromic acid.

3. A process for reducing the phosphorus contents of sludge comprising admixing said sludge and a water-soluble inorganic hexavalent oxy-chromium compound in the presence of an aqueous medium, said compound being present at a concentration of below about 20% by weight, and separating phosophorus from said sludge.

4. A process according to claim 3 wherein said compound is chromic acid.

5. A process according to claim 4, wherein said chromic acid is present in concentrations of from about 0.01% to 10.0% by weight.

6. In the process for preparing elemental phosphorus wherein phosphatic materials are thermally reduced with a reducing agent in the presence of a flux to produce phosphorus-containing gases and thereafter condensing said phosphorus in said gases by spraying said gases with an aqueous condensing medium having a temperature below the dew point of phosphorus, collecting the liquid phosphorus-containing materials therefrom, separating said materials into a phosphorus-containing sludge phase and a phosphorus phase and separating said phases, the improvement which comprises reducing the phosphorus content of sludge by admixing, in the presence of an aqueous medium, said sludge with chromic acid, and recovering phosphorus therefrom.

7. In the process for preparing elemental phosphorus wherein phosphatic materials are thermally reduced with a reducing agent in the presence of a flux to produce phosphorus-containing gases by spraying said gases with an aqueous condensing medium having a temperature below the dew point of phosphorus, collecting the liquid phosphorus-containing materials therefrom, separating said materials into a sludge phase and a phosphorus phase, separating said phases and centrifuging said sludge phase to recover phosphorus-containing sludge impurities therefrom, the improvement which comprises reducing the phosphorus content of the phosphorus-containing sludge impurities by admixing, in the presence of an aqueous medium, said phosphorus-containing sludge impurities with chromic acid, and recovering phosphorus therefrom.

References Cited

UNITED STATES PATENTS

| 1,856,144 | 5/1932 | Wietzel | 23—165 |
| 3,084,029 | 4/1963 | Barber et al. | 23—223 |
| 3,113,839 | 12/1963 | Barber et al. | 23—223 XR |
| 3,152,870 | 10/1964 | Baumgartner et al. | 23—219 |
| 3,318,665 | 5/1967 | Schmidt et al. | 23—219 |
| 3,104,952 | 9/1963 | Hartig | 23—293 |

FOREIGN PATENTS

| 524,289 | 8/1940 | Great Britain. |
| 624,307 | 4/1963 | Belgium. |

EDWARD STERN, *Primary Examiner.*

U.S. Cl. X.R.

23—293, 312